United States Patent
Avila et al.

(10) Patent No.: US 9,538,884 B2
(45) Date of Patent: Jan. 10, 2017

(54) AGITATOR FOR FOOD AND BEVERAGE MIXER

(71) Applicant: MEDport LLC, Providence, RI (US)

(72) Inventors: Dustin R. Avila, Bristol, RI (US); Jessica Tamborino, Alexandria, VA (US)

(73) Assignee: FIT & FRESH, INC., Indianapolis, IN (US)

( * ) Notice: Subject to any disclaimer, the term of this patent is extended or adjusted under 35 U.S.C. 154(b) by 0 days.

(21) Appl. No.: 14/950,885

(22) Filed: Nov. 24, 2015

(65) Prior Publication Data

US 2016/0073829 A1    Mar. 17, 2016

Related U.S. Application Data

(62) Division of application No. 13/530,964, filed on Jun. 22, 2012.

(51) Int. Cl.
| | |
|---|---|
| *B01F 13/00* | (2006.01) |
| *A47J 43/27* | (2006.01) |
| *B01F 15/00* | (2006.01) |

(52) U.S. Cl.
CPC .............. *A47J 43/27* (2013.01); *B01F 13/005* (2013.01); *B01F 15/00512* (2013.01)

(58) Field of Classification Search
CPC .......................... B01F 13/005; B01F 13/0052
USPC .................................. 366/130, 273, 274, 342
See application file for complete search history.

(56) References Cited

U.S. PATENT DOCUMENTS

| | | | | |
|---|---|---|---|---|
| 275,132 | A * | 4/1883 | Lonegan et al. .......... | E02B 3/04 405/32 |
| 818,392 | A * | 4/1906 | Parks ........................ | B05B 7/32 239/142 |
| 2,198,861 | A * | 4/1940 | Chamberlain ........... | B01J 19/30 261/95 |
| 2,466,468 | A * | 4/1949 | Neal ........................ | A47J 43/09 241/170 |
| 3,514,081 | A * | 5/1970 | Cavanaugh ......... | B01F 13/0818 156/86 |
| 5,544,960 | A * | 8/1996 | Sommovigo ........... | A47J 43/27 366/130 |
| 2004/0068234 | A1* | 4/2004 | Martin ............... | A61B 17/7095 604/187 |

* cited by examiner

*Primary Examiner* — David Sorkin
(74) *Attorney, Agent, or Firm* — Cook Alex Ltd.

(57) ABSTRACT

A cup for receiving a beverage includes a container body having a side wall and a bottom wall joined at a first radius. A removable lid may be selectively affixed to the top of the side wall. An agitator is also received inside the container body to enhance mixing of the beverage. The agitator has a weighted, central hub and a plurality of elongated projections extending radially from the hub. The projections join the hub at a root and extend to a free end. The free ends are capped by domes having a second radius less than or equal to the first radius. All of the projections have substantially the same length. This affords a shape that allows the agitator to roll freely on the bottom wall or in the corners. Any one of the projections can reach into a corner of the cup and dislodge any solids that may have settled in a corner.

8 Claims, 2 Drawing Sheets

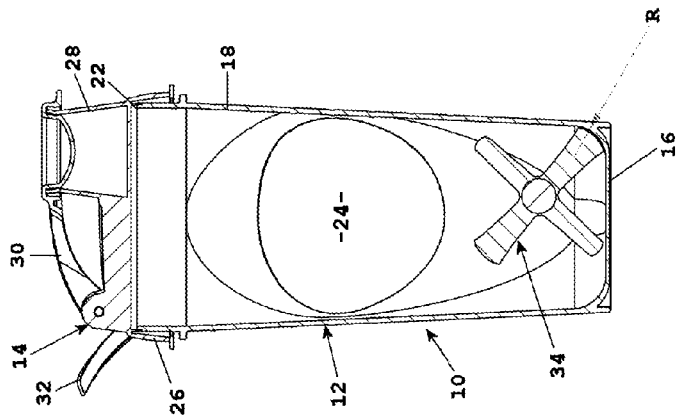
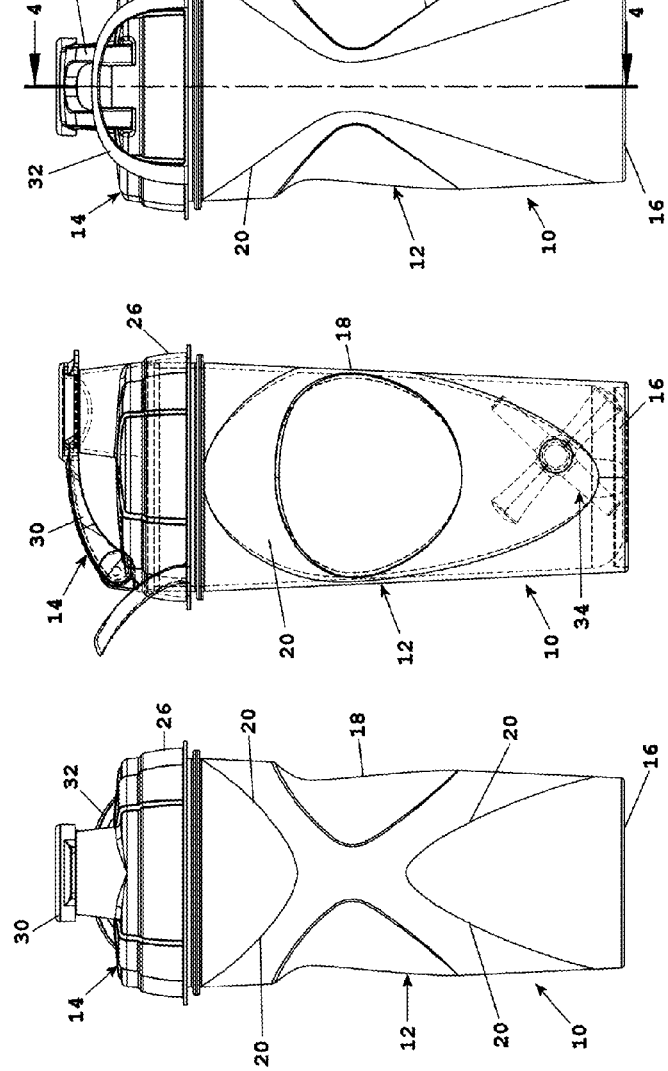
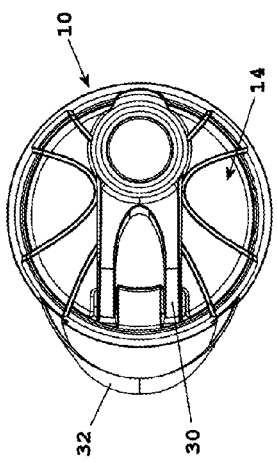

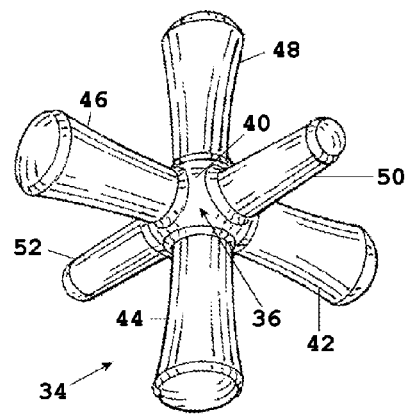
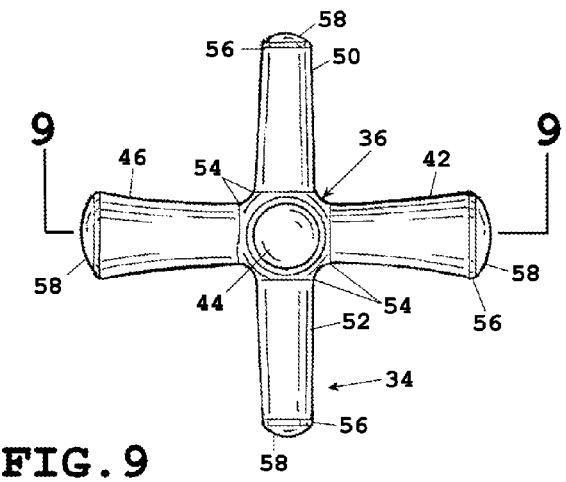
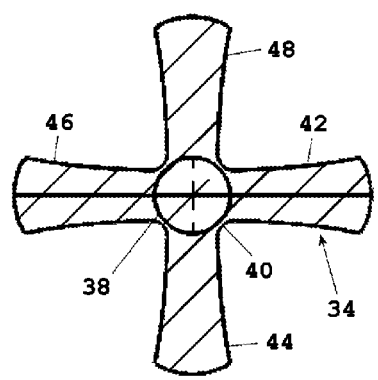
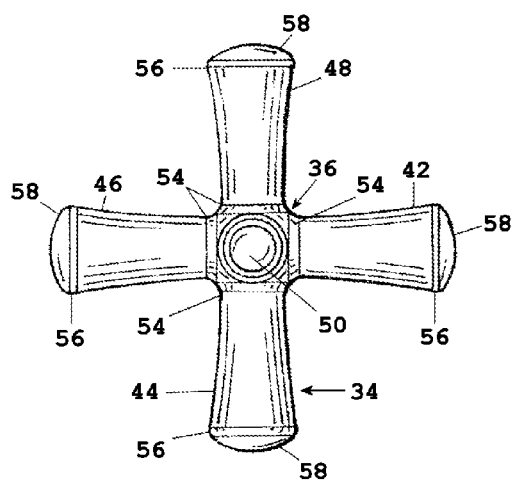
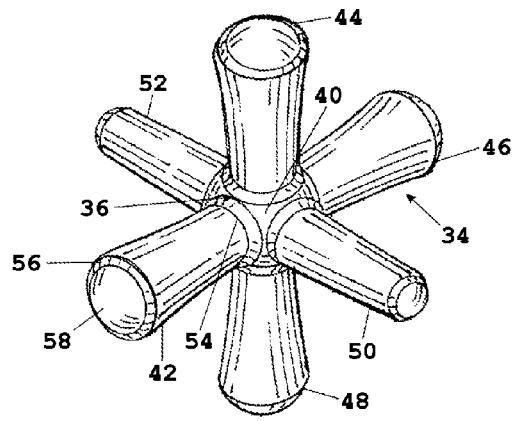

AGITATOR FOR FOOD AND BEVERAGE MIXER

CROSS-REFERENCE TO RELATED APPLICATION

This application is a divisional of U.S. patent application Ser. No. 13/530,964, filed Jun. 22, 2012, the disclosure of which is incorporated herein in its entirety.

BACKGROUND

Field of the Disclosure

The present invention generally relates to cups for containing and dispensing contents such as beverages. More particularly, this invention relates to an improved agitator for mixing the contents of a cup and to a cup containing such an agitator. It will be understood that as used herein the term "cup" refers broadly to any size, shape or type of drinking vessel.

Description of Related Art

There are numerous portable cups which are commonly sold and used for the containment of beverages such as water, juice, soft drinks, shakes, nutritional supplements or infant formulas. Typically, such containers have a lid which selectively covers an opening through which the cup is filled. The lid often includes an aperture for dispensing the contents from the cup. A cover can be selectively positioned to open or close the aperture.

Problems arise with current cups when the beverage is a suspension having components such as powders, syrups or the like blended into a liquid carrier. Preferably, the initial blending or mixing occurs while both the components and the carrier are within the cup itself. Proper initial mixing of the components and carrier can be problematic if it requires a separate stirring element such as a spoon or the like. The separate stirring element typically requires the lid to be left off the container for stirring which increases the chances for spillage. Availability of a separate stirring element is not always assured and even where it is used it creates an additional item to be cleaned. Furthermore, in instances where an initially mixed beverage stands still, beverage components may tend to settle toward the bottom of the cup. Upon settling, the beverage is no longer homogeneous and will not have the proper taste, texture and efficacy. In that case the lid has to be re-opened and the separate stirring element has to be brought back into use, thereby recreating the original nuisance.

These issues can be addressed by use of an agitator placed in the cavity of the cup. The cup is shaken to mix the contents and the agitator bounces around inside the cup, mechanically breaking up agglomerations of solid particles and creating turbulence that enhances mixing of the solids and liquids. Agitators for mixing solids and liquids in a container are known. Some of these agitators are intended for use in aerosol cans, such as are commonly used for spray paint for example. Due to the need to retain elevated pressure inside the aerosol cans, such cans do not have removable lids. Accordingly, the agitators will not be extracted from the can and reused; they will be discarded with the can when it is empty. Thus, there is no concern in the design of the aerosol agitators for cleaning and handling the agitator. This is contrasted with beverage agitators used in cups containing foodstuffs. A user will open and refill a beverage cup numerous times, with cleaning of the cup and agitator commonly being done between uses. Thus, the needs for cleaning and long-term durability distinguish beverage agitators from aerosol agitators.

Examples of beverage agitators include the wire frame agitator shown in U.S. Pat. No. 6,379,032. This agitator has the disadvantages of being difficult to clean and its metal wires can scratch the interior of a plastic cup, which creates places for bacteria to grow. The ball-shaped agitator cannot fit into corners of a cup which often leaves agglomerated beverage components, such as clumps of powder in the bottom edges of the container. Also, at roughly 14-16 grams its relatively light weight has trouble bursting through the powder of some nutritional supplements.

Sommovigo U.S. Pat. No. 5,544,960 has a faceted beverage agitator in the nature of a truncated sphere. With this shape it is incapable of extending into the bottom corners of a cup to scrape out beverage components that may have settled there.

Church U.S. Pat. No. 4,641,975 has a star-shaped aerosol agitator. Since this agitator is not intended for reuse or for use with drinkable fluids, it is not suitably shaped to be cleaned. Further, it is deliberately made non-symmetrical and unbalanced with the idea that an unbalanced agitator will trace nonpredictable random mixing patterns regardless of the user's shaking motion. Espey U.S. Pat. No. 5,236,262 is another aerosol agitator having a generally rounded main portion and at least one projection extending from the main portion.

SUMMARY

In accordance with an embodiment of the present invention, a cup is provided which includes an elongated container body and a removable lid. The container body has a generally cylindrical side wall and a bottom wall joined to the side wall at a first radius. Together the side wall and bottom wall define an interior cavity and an open mouth. The lid is selectively engageable with the side wall to close the mouth. The lid has a dispensing aperture and a closure arm, which selectively opens and closes the aperture.

An improved agitator is designed for placement with the beverage in the interior cavity of the container body. The agitator has a weighted, central hub. A plurality of elongated projections extend radially from the hub. The projections join the hub at a root and extend to a free end. The projections may include spokes which have their smallest diameter at the root and flare outwardly from the root to the largest diameter at the free end. The projections may also include one or more posts, each of which has its largest diameter at the root and tapers outwardly therefrom to the smallest diameter at the free end. The free ends of the projections are capped by rounded domes. The radius of the domes is less than or equal to the first radius at the cup's bottom wall and side wall intersection. All of the projections have substantially the same length. This affords a shape that allows the agitator to roll freely on the bottom wall or in the corners. Also, any one of the projections can reach into a corner of the cup and dislodge any solids that may have settled in a corner.

The hub has a weighted core, such as a metal ball. A sheath tightly covers the core. The sheath may be formed by molding it over the core. The projections are connected to the sheath and may be molded therewith.

BRIEF DESCRIPTION OF THE DRAWINGS

FIG. 1 is a front elevation view of an embodiment of a cup of the present invention.

FIG. 2 is a side elevation view of the cup shown in FIG. 1, with an agitator of the present invention shown therein in phantom lines.

FIG. 3 is a rear elevation view of the cup shown in FIG. 1.

FIG. 4 section taken along line 4-4 of FIG. 3.

FIG. 5 is a top plan view of the cup shown in FIG. 1.

FIG. 6 is a perspective view of an embodiment of an agitator of the present invention, on an enlarged scale compared to the previous figures.

FIG. 7 is a front elevation view of the agitator of FIG. 6.

FIG. 8 is a top plan view of the agitator.

FIG. 9 is a section taken along line 9-9 of FIG. 7.

FIG. 10 is another perspective view of the agitator.

DETAILED DESCRIPTION

An embodiment of a cup is illustrated generally at 10 in FIGS. 1-5. The cup 10 includes two main parts, a container body 12 and a lid 14. The lid is releasably mountable on top of the container body. In the illustrated embodiment, the container body 12 has a generally elongated cylindrical shape, with a bottom wall 16 joined to an upstanding side wall 18 at a first radius R (FIG. 4). In one embodiment the first radius R may be about 0.50 inches. The outer surface of the side wall may have a set of ribs 20 which protrude slightly from the rest of the side wall exterior to help provide the user with a better grip on the cup. The side wall 18 terminates at its upper end at an open mouth 22. Together the bottom wall 16 and side wall 18 define an interior cavity 24 (FIG. 4) which is sized and configured for receiving and temporarily storing a beverage, such as water, juices, soft drinks, energy drinks, nutritional supplement drinks, or shakes. It will be appreciated that the container body 12 may have any convenient configuration and its form may depend, in part, on the type of cup desired.

As mentioned above, the open mouth 22 of the container body 12 is selectively closed by the lid 14. The lid has a skirt 26 sized to fit over the top of the container body. Threads may be formed on the lid 14 and container body 12 so that the lid and container body may be selectively threadedly engaged or disengaged as desired. When the lid and container body are engaged the interior cavity 24 is formed into a closed, fluid-tight cavity. An aperture 28 in the lid may be selectively opened and closed by a closure arm 30. A carrying loop 32 may also be formed on the lid. The lid 14 and closure arm 30 are typically injection molded, out of conventional polymers such as polypropylene. However, it will be appreciated that the invention is not limited to this material and that any suitable material may be used.

In order to allow the user to selectively dispense the contents from the cup, the elongated closure arm 30 is pivotally mounted to the lid. In the illustrated embodiment a hinge configuration allows the closure arm 30 to be pivoted by the user between a closed position (as shown in FIGS. 1-5) and an open position (not shown). When the closure arm 30 is in the open position, the aperture 28 is unobstructed and when the closure arm 30 is in the closed position, the aperture 28 is sealed in order to prevent the contents from flowing out of the interior cavity 24 of the cup 10. It will be appreciated that any variety of hinge configurations could be used. Further details of a lid structure are shown in U.S. Pat. No. 8,672,164, issued Mar. 18, 2014, the disclosure of which is hereby incorporated by reference herein.

FIGS. 2 and 4 illustrate the agitator of the present invention generally at 34. It will normally rest on the bottom wall 16 but it is free to move about in the interior cavity 24 when the cup is shaken, swirled, rotated or otherwise agitated by the user.

Details of the agitator 34 are shown in FIGS. 6-10. The agitator has a central hub 36 which is generally spherical. The hub 36 has an interior core 38 (FIG. 9) which preferably is a weighted metal ball, such as a ball from a ball bearing. Molded around the core 38 is a sheath 40. The sheath is preferably made of polyethylene although other materials could be used. For reference purposes, and not by way of limitation, in one embodiment the ball may have a diameter of about 0.54 inches and a weight of about ten grams. The sheath may have a diameter of about 0.64 inches.

Extending radially from the hub are a plurality of elongated projections. Each projection includes a rod portion and a rounded dome on the free end of the rod. The rods may have a variety of cross-sectional shapes. In the illustrated embodiment there are two different types of rods—spokes and posts. In this embodiment there are four spokes 42, 44, 46 and 48 and two posts 50 and 52. The number and types of projections could be other than as shown. For example, the rods could be all spokes or all posts. Also, the projections need not always be diametrically aligned with another projection on the opposite side of the hub.

Each rod extends from a root 54 at the sheath 40 to a free end 56. The free ends are capped by a rounded dome 58. The rods join the sheath where they form a radius between adjacent rods of about 0.11 inches. This radius makes the agitator easier to clean because it eliminates a sharp corner where food particles could adhere. As an example of the projection's length, the overall distance from the tip of a dome of one projection to the tip of the dome of an oppositely aligned projection may be about 2.5 inches.

The spokes 42, 44, 46 and 48 flare outwardly from the root 54 to the free end 56. That is, the spokes have a frusto-conical shape with a minimum diameter at the root 54 and a maximum diameter at the free end 56. By way of example and not limitation, the diameter at the root may be about 0.35 inches and the diameter at the free end may be about 0.52 inches. The second radius of the dome 58 on a spoke is about 0.50 inches. This second radius is selected to be no larger than the first radius R of the intersection of the bottom wall and side wall of the cup. This assures that the end of the projection can extend all the way into the corner to scrape food particles off the cup.

The posts 50, 52 taper down as they extend outwardly from their root 54 to their free end 56, just the opposite of the spokes. The posts also have a frusto-conical shape but instead of the minimum diameter being at the root as in the spokes, the post's minimum diameter is at the free end and the maximum diameter is at the root. In the agitator with the sizes noted above, the posts may have a free end diameter of about 0.28 inches and a root diameter of about 0.33 inches. The radius of the dome 58 on the posts may be about 0.25 inches.

The projections are preferably molded from the same material as the sheath 40 of the hub 36. As mentioned above, polyethylene is a suitable material for the sheath and thus for the projections as well. With this material and the dimensions given above, the projections and sheath will have a weight of about ten grams, giving the agitator a total weight of about twenty grams. An agitator of this size has been found to have sufficient mass to burst through foodstuffs such as powdered nutritional supplements and the like.

The projections all have substantially the same length. This enables any one of them to reach into a corner of a cup and dislodge any food particles that have settled there.

Furthermore, the projections are spaced from one another sufficiently that no projection will interfere with another's extension into a corner of a cup. While the illustrated orthogonal arrangement among six projections is preferred, some variation from an orthogonal arrangement could be tolerated. However if the angle between adjacent projections became much less than about 75° there arises the problem of one projection hitting one of the cup walls and preventing an adjacent projection from extending fully into the corner.

In addition to being spaced apart from one another the projections are also slender enough to effectively reach into corners of the cup. The rod-like configuration of the projections enables them to act individually without interference from an adjacent projection.

In operation, a user may insert the desired beverage through the open mouth 22 and into the interior cavity 24 of the container body 12. The agitator 34 is also placed in the container body 12. The user may selectively secure the lid 14 to the top portion of the lid. With the closure arm 30 in the closed position, a user may manually agitate the cup to create a disturbance of the beverage within the cup 10. When the user desires to drink the beverage, the user may pivot the closure arm 30 to the open position to unseal the dispensing aperture 28. In this position the beverage can be selectively dispensed from the aperture 28. When the user no longer wants to dispense the beverage, the closure arm 30 can be pivoted back to the closed position such as to create a fluid-tight seal.

One of the advantages of having all the projections of about the same length is the agitator can roll easily around the perimeter of the bottom wall and as it does so it is assured of scraping or cleaning the corners of the cup. Unlike non-uniform agitators that require a particular, elongated projection to align with the corner to clean it out, with the present invention no particular orientation of the agitator is needed to get a particular projection into the corner. This is because any and all projections will reach into the corners to perform the corner cleaning function. Thus, a user can swirl the cup gently about a vertical axis to get the agitator to roll around the bottom of the cup with assurance that the bottom and corner of the cup will be cleaned of settled food particles. While a vigorous up-and-down shaking of the cup is possible if the user desires (and may be preferable for initial mixing), it is not necessary to shake the cup in that manner. Especially for re-mixing after settling, a circular swirling motion will work. Gentle swirling has the added advantage of not entraining air into the beverage.

It will be understood that the above examples are merely exemplary of the cup and agitator arrangement of the present disclosure. Variations of these examples may become apparent to those of ordinary skill in the art upon reading the foregoing description. It will be appreciated that skilled artisans may employ such variations as desired, and cups and agitators of the present disclosure may be constructed otherwise than as specifically described herein. Accordingly, all modifications and equivalents of the subject matter described herein are intended to be covered by the claims appended hereto as permitted by applicable law. Moreover, any combination of the above-described elements and all possible variations thereof are encompassed by the present disclosure unless otherwise indicated herein or otherwise clearly contradicted by context.

We claim:

1. A cup for receiving beverage components and a liquid carrier, the cup comprising:
   a container body having a bottom wall and side wall, the side wall defining a vertical axis of the container body, the the bottom wall and side wall intersecting one another at an arc in a vertical plane through the vertical axis, the arc between the bottom wall and the side wall having a first radius; and
   an agitator for placement in the container body and having a central hub and a plurality of elongated projections extending radially from the hub, the projections having substantially the same length and each projection terminating at a dome having a second radius that is less than or equal to the first radius.

2. The cup of claim 1 further comprising a lid sized for selective engagement with the top of the container body.

3. The cup of claim 1 wherein the central hub has a core covered by a sheath.

4. The cup of claim 3 wherein the core is a metal ball.

5. The cup of claim 3 wherein the sheath is made of a polymer material.

6. The cup of claim 3 wherein the projections attach to the hub at a root and extend from the root to a free end.

7. The cup of claim 6 wherein the projections include at least one post with the post having a larger diameter at the root than at the free end.

8. The cup of claim 6 wherein the projections include at least one spoke with the spoke having a larger diameter at the free end than at the root.

* * * * *